(12) United States Patent
Shin et al.

(10) Patent No.: US 6,363,298 B1
(45) Date of Patent: Mar. 26, 2002

(54) METHOD AND APPARATUS FOR GENERATING TOOL PATHS

(75) Inventors: Hayong Shin, Troy; Robert M. Trecapelli, Oxford, both of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/178,122

(22) Filed: Oct. 23, 1998

(51) Int. Cl.[7] .............................................. G06F 19/00
(52) U.S. Cl. ..................... 700/160; 700/98; 700/159; 700/118; 700/161; 700/163; 700/181; 264/510; 264/516; 359/458; 382/154; 345/418; 345/420
(58) Field of Search .......................... 700/97, 98, 159, 700/160, 161, 163, 181–189, 118; 264/510–516, 139; 345/418, 420, 427, 257; 382/154; 359/458

(56) References Cited

U.S. PATENT DOCUMENTS

| 5,189,626 A | | 2/1993 | Colburn ....................... 700/184 |
| 5,223,777 A | * | 6/1993 | Werner et al. ............... 318/569 |
| 5,351,196 A | * | 9/1994 | Sowar et al. ................ 700/182 |
| 5,388,199 A | * | 2/1995 | Kakazu et al. .............. 345/357 |
| 5,506,785 A | * | 4/1996 | Blank et al. ................... 700/98 |
| 5,561,601 A | * | 10/1996 | Inoue et al. ................ 700/182 |
| 5,687,209 A | * | 11/1997 | Adams ........................ 378/22 |
| 5,710,709 A | * | 1/1998 | Oliver et al. ............... 700/184 |
| 5,815,400 A | * | 9/1998 | Hirai et al. ................. 700/173 |
| 6,120,171 A | * | 9/2000 | Shaikh ........................ 700/98 |

FOREIGN PATENT DOCUMENTS

EP 0996045 A2 * 9/1999

OTHER PUBLICATIONS

B.K. Choi, *Surface Modeling for CAD/CAM*, Elsevier, 1991, pp. 354–356, pp. 360–361.

* cited by examiner

*Primary Examiner*—William Grant
*Assistant Examiner*—Ramesh Patel
(74) *Attorney, Agent, or Firm*—Ralph E. Smith

(57) ABSTRACT

An apparatus and method for generating tool paths for cutting a physical part. The present invention includes storing geometric data indicative of the geometric configuration of the part. A plurality of planes are used to slice the geometric data. Micro features of the part are recognized based upon the sliced geometric data. Macro features of the part are determined based upon groupings of the recognized micro features. Tool path data is generated based upon the determined macro features of the part. Thereupon, the tool path data is used for cutting the physical part.

18 Claims, 15 Drawing Sheets

METHOD AND APPARATUS FOR GENERATING TOOL PATHS

BACKGROUND OF THE INVENTION

1. Field of the Invention

The present invention relates generally to machine cutting tools, and more particularly, to control systems for machine cutting tools.

2. Description

Within the automotive manufacturing industry, die parts are used to stamp sheet metal into automotive parts. The die parts themselves are manufactured from an iron-based material being casted via a Styrofoam® pattern. Since the die part usually has intricate slots and precisely positioned holes and other physical features, the Styrofoam® pattern must be accurately shaped to allow the cooling cast iron material to assume the desired shape for stamping the sheet metal.

The Styrofoam® pattern is cut from a Styrofoam® stock piece by a numerical control (NC) tool cutting machine. Tool path data is fed into the NC tool cutting machine to indicate how the NC machine is to cut the Styrofoam® pattern from the Stryrofoam® stock piece.

Present approaches include without limitation time-intensive and trial-and-error Computer-Aided Manufacturing (CAM) approaches to generate the correct tool path data to be fed into the NC tool cutting machine. Within this type of approach, the user of the CAM tool is usually closely involved in examining the physical characteristics of the die part to be produced. With the die part having been examined by the user via the CAM tool, the user determines a set of tool paths to cut the Styrofoam® pattern. This type of an approach may consume as much as three days to generate the correct data to cut the Styrofoam® pattern due to, among other reasons, the user being so closely involved in examining the die part and in determining the tool paths.

SUMMARY OF THE INVENTION

The present invention overcomes the aforementioned disadvantages and other disadvantages. The present invention is a computer-implemented apparatus and method for generating tool paths for cutting a physical part. The present invention includes storing geometric data indicative of the geometric configuration of the part. A plurality of planes are used to slice the geometric data. Micro features of the part are recognized based upon the sliced geometric data. Macro features of the part are determined based upon groupings of the recognized micro features. Tool path data is generated based upon the determined macro features of the part, and the tool path data is used for cutting the physical part.

BRIEF DESCRIPTION OF THE DRAWINGS

Additional advantages and features of the present invention will become apparent from the subsequent description and the appended claims, taken in conjunction with the accompanying drawings in which:

FIG. 4b is a grid depicting layer numbers of the sliced z-map model shown in FIG. 4a;

DETAILED DESCRIPTION OF THE PREFERRED EMBODIMENT

Figure 1:
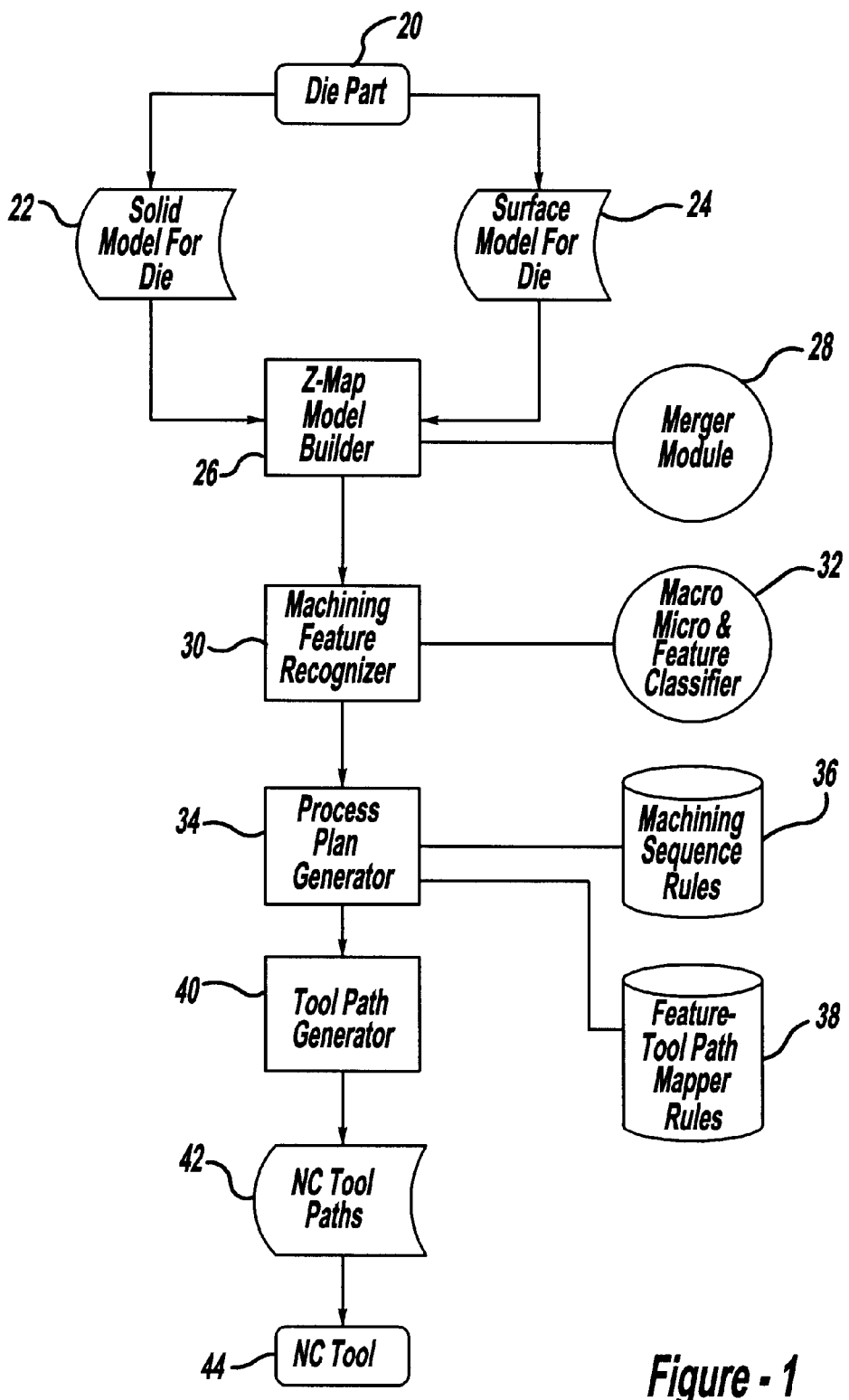
FIG. 1 is a block diagram depicting the inventive computer system for generating tool paths for cutting a physical part.

FIG. 1 is a system block diagram depicting the manner in which tool path data 42 is generated for die part 20 for determining numerical control (NC) tool paths. Solid model data 22 and surface model data 24 are generated for die part 20. Solid model data 22 and surface model data 24 are indicative of the geometric characteristics of die part 20. Solid model data 22 includes information regarding the planar surfaces of die part 20. Surface model data 24 includes information of the non-planar surfaces of die part 20.

A z-map model builder 26 constructs z-map model data for use in the present invention based upon the solid model data 22 and surface model data 24. Z-map model builder 26 utilizes a merger module 28 in order to properly combine data from solid model data 22 and surface model data 24.

Based upon the resulting z-map model from z-map model builder 26, machining feature recognizer 30 classifies features first into micro features and then into macro features. The micro and macro features classification process allows the present invention to analyze the z-map model at different levels of detail in order to produce optimal cutting paths for die part 20.

A process plan generator module 34 uses machining sequence rules 36 and feature-tool path mapper rules 38 in order to calculate which tool paths are needed for the recognized features. Machining sequence rules 36 provide a prioritized scheme for which features should be cut first. Feature-tool path mapper rules 38 provides what type of tool path should be utilized for a particular recognized macro feature.

Tool path generator module 40 produces NC tool path data 42 based upon the process plan generated by module 34. In the preferred embodiment, the present invention utilizes the CATIA computer program in order to verify the NC tool path data 42. The CATIA computer program is available from the following company: Dassault Systemes located in France. NC tool path data 42 is used by NC machine 44 to cut a stock part (typically made of Styrofoam®) which is then used to help construct die part 20.

Figure 2:
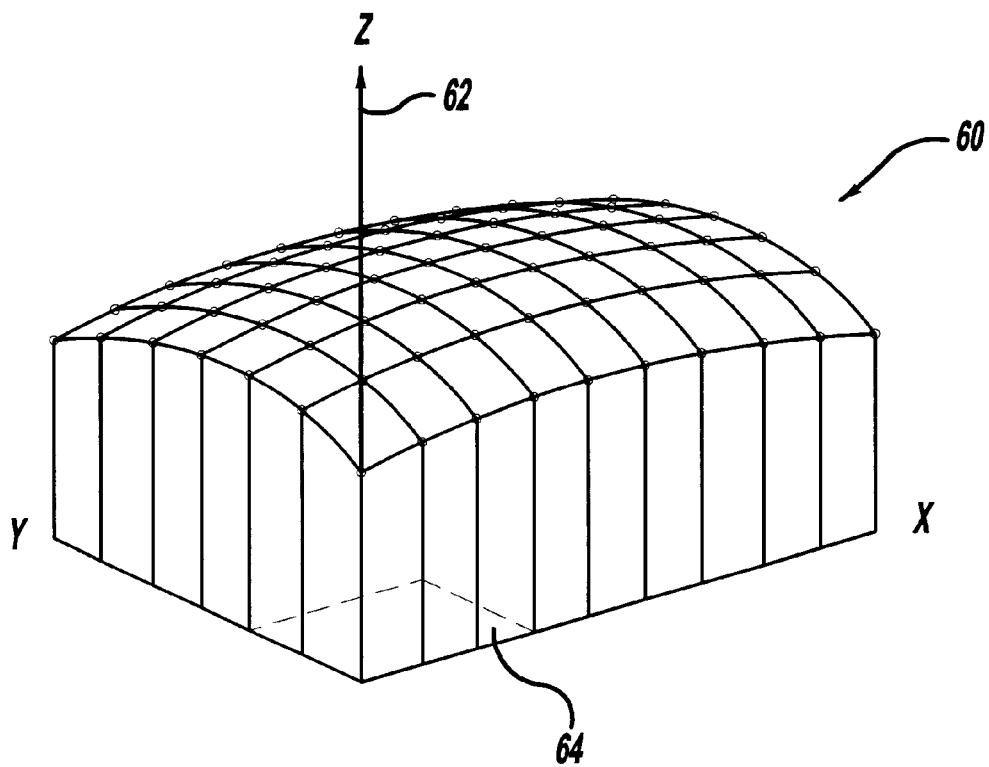
FIG. 2 is an x-y-z graph illustrating an exemplary z-map model.

FIG. 2 depicts an exemplary z-model 60. The z-axis is depicted at reference numeral 62 and the x-y plane is depicted at reference numeral 64. For a general discussion of the z-map model mathematical technique, please consult the following reference: B. K. Choi, *Surface Modeling for CAD/CAM*, Elsevier, 1991, pp. 360–361.

Figure 3:
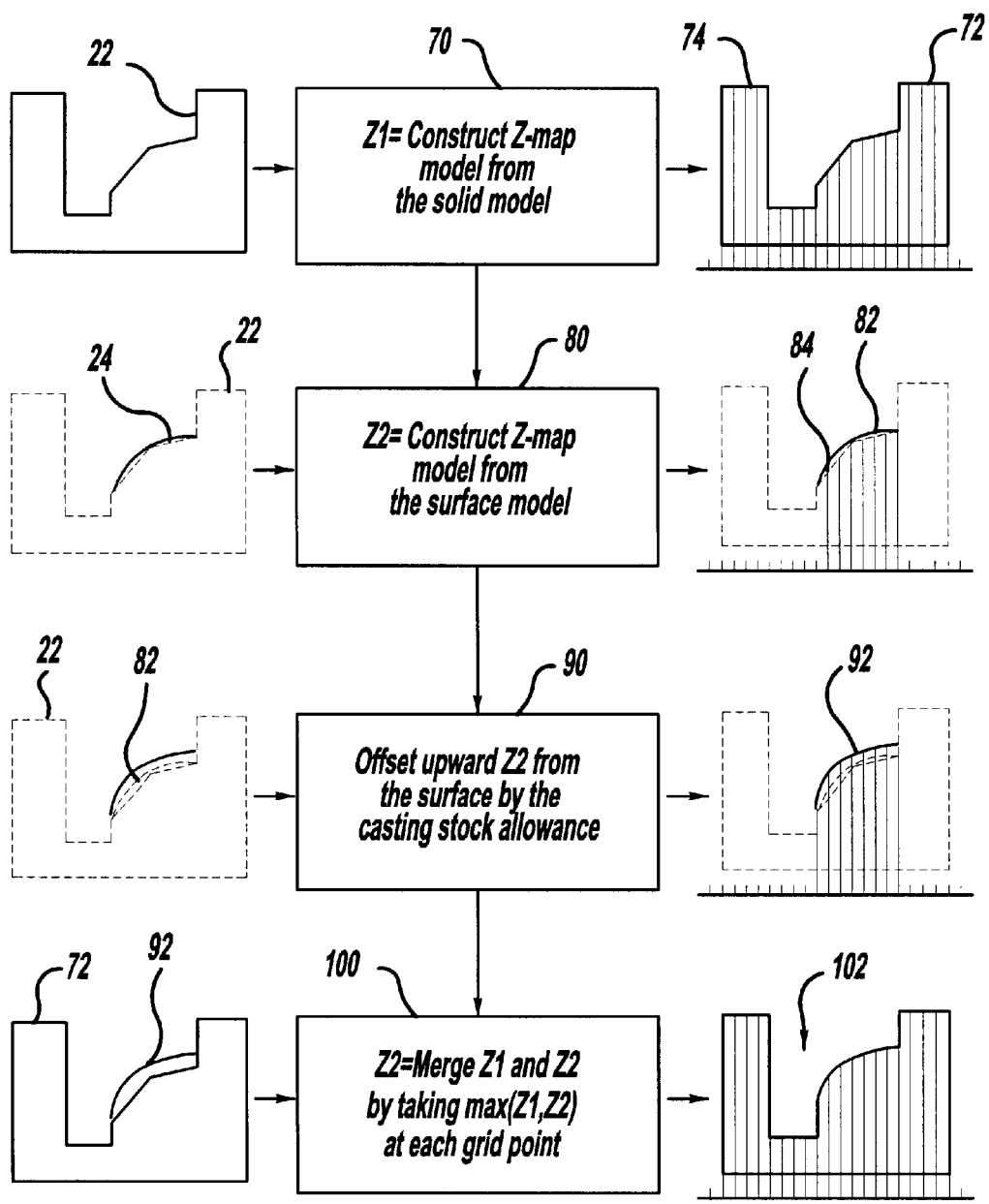
FIG. 3 is a flow chart depicting the steps for constructing a z-map model.

FIG. 3 depicts the steps to construct a z-map model for subsequent use by the other computer-implemented modules of the present invention to generate tool path data. Process block 70 constructs a first z-map model 72 from solid model data 22. An exemplary z-value of the first z-map model 72 is depicted at reference numeral 74. Process block 80 constructs a second z-map model 82 from the surface model 24. An exemplary z-value is indicated at reference numeral 84.

Process block 90 offsets in an upward manner second z-map model 82 from the surface by the casting stock allowance in order to produce an offset second z-map model 92. The casting stock allowance is utilized by the present invention in order to account for shrinkage of casting stock. In the preferred embodiment, typical casting stock allowance values include, but are not limited to, such values as generally ten to twelve millimeters.

Process block 100 merges the first z-map model 72 and the second z-map offset model 92 by taking the maximum value between the first z-map model 72 and the offset z-map model 92 at each position in order to produce the resulting z-map model 102.

Figure 4A:
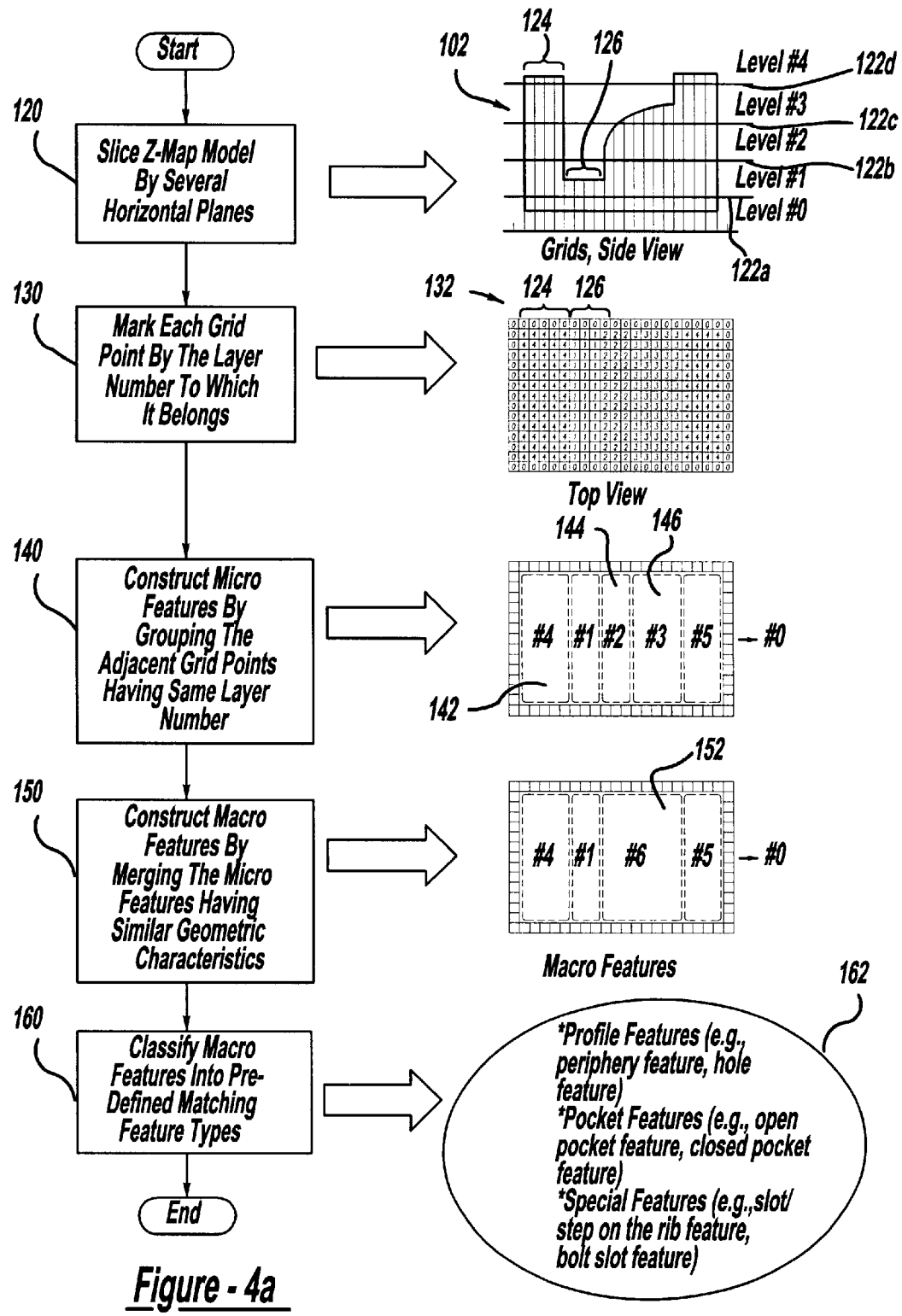
FIG. 4a is a flow chart depicting the steps for recognizing machining features.

FIG. 4a depicts the processing steps for recognizing such machining features as, but not limited to, bolt slot features or open pocket features. Process block 120 slices z-map model 102 by a predetermined number of horizontal x-y planes (122a, 122b, 122c, and 122d). The horizontal x-y planes (122a, 122b, 122c, and 122d) partition z-map model into various levels. For example, horizontal x-y planes 122b and 122c partition the z-map model 102 into a level #2.

Figure 4B:
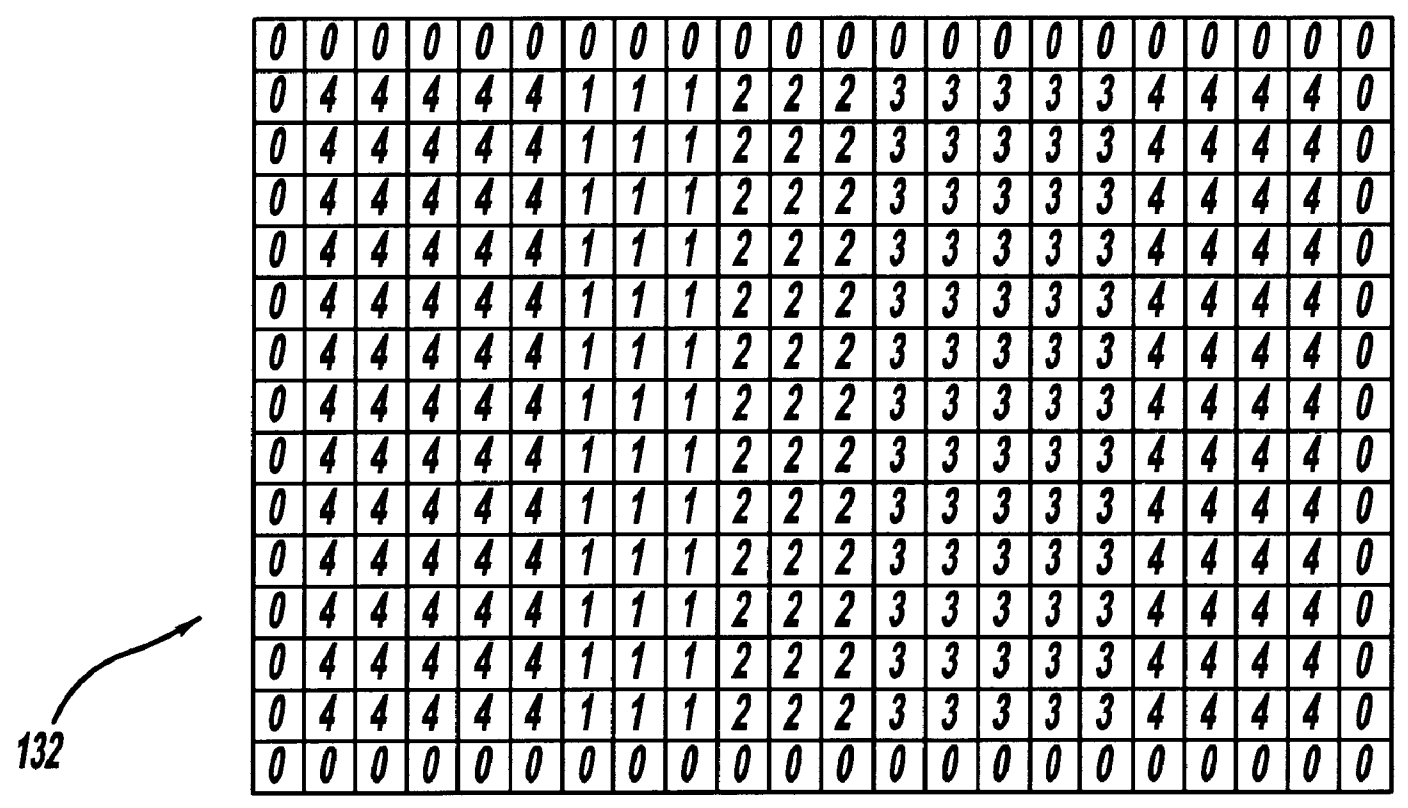

Z-points are associated with a particular level number. For example, the points as depicted by reference numeral 124 are associated with a level value of four. Moreover, z points as depicted by reference numeral 126 are associated with a level value of one. Process block 130 marks each grid point (e.g., points 124 and 126) by the layer number to which it belongs in order to produce grid 132. Grid 132 is a top view of the z points of the z-map model 102. Grid 132 contains the z-points 124 with the level value of four. FIG. 4b provides an enlarged view of grid 132.

It should be understood that the present invention is not limited to the number of horizontal x-y planes depicted in FIG. 4a but includes an appropriate number of planes that will yield the desired level of resolution for a given application.

With reference made to FIG. 4a, process block 140 constructs micro features by grouping the adjacent grid points which have the same level number. For example, z points 124 of grid 132 are grouped together as micro feature 142.

Process block 150 constructs macro features by merging the micro features which have similar geometric characteristics. For example, micro features 144 and 146 which correspond to a gradual sloping surface in z-map model 102 are merged to form macro feature 152. The present invention includes considering such geometric characteristics as slope and gap values of the micro features. For example, if the maximum vertical gap between two adjacent micro features is less than five millimeters, then those two micro features are merged into a macro feature.

Process block 160 classifies the macro features into predetermined machining feature types 162. The predetermined machining feature types include, but are not limited to, profile features, pocket features, and special features which further decompose into the following feature subclasses:

| Feature Class | Feature Subclass |
| --- | --- |
| Special Feature | Slot/Step on Rib Feature |
| Special Feature | Bolt Slot Feature |
| Profile Feature | Periphery Profile Feature |
| Profile Feature | Through-Pocket (Hole) Profile Feature |
| Pocket Feature (with curved or planar bottom) | Open Pocket Feature |
| Pocket Feature (with curved or planar bottom) | Closed Pocket Feature |

Process block 160 performs the feature classification by examining the geometric characteristics of the macro features, such as, but not limited to, shape of boundary curves associated with the macro features. For example, if the bottom of a macro feature is at the lowest layer, it is classified as a periphery feature or a hole feature. As another example, if all neighboring grids are higher than the grids on the boundary curve of a macro feature, and the bottom faces inside of the boundary curve is planar, it is classified as a planar closed pocket feature.

Figure 5A:
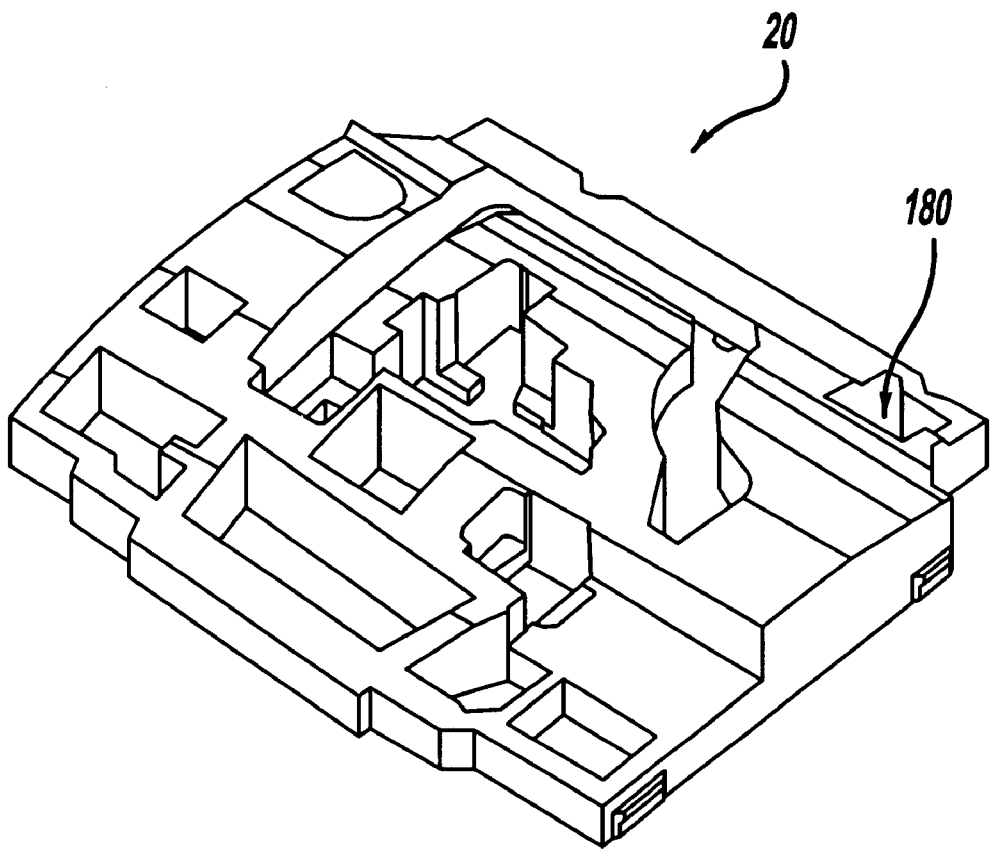
FIG. 5a is a diagrammatic prospective view depicting an exemplary die part model.

FIG. 5a depicts a graphical representation of an exemplary die part 20. Die part 20 illustrates several machining feature types which are recognized by the present invention in order to produce data for determining tool paths. For example, the through-pocket profile feature is indicated at reference numeral 180.

Figure 5B:
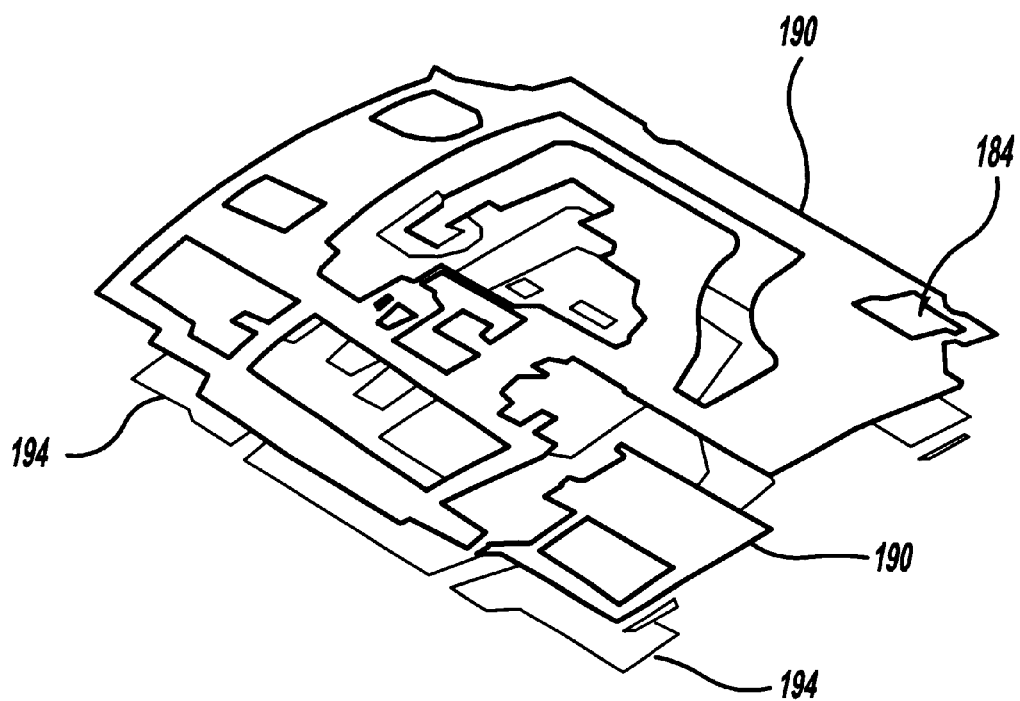
FIG. 5b is a diagrammatic prospective view depicting identified machining features.

FIG. 5b is a graphical representation of machining features which have been recognized through the techniques of the present invention. Top surface 190 depicts the upper model surface of the die part. Bottom surface 194 depicts the base portion of the die part. For example, through-pocket profile feature 180 of the die part 20 is shown by reference numeral 184.

Figure 5C:
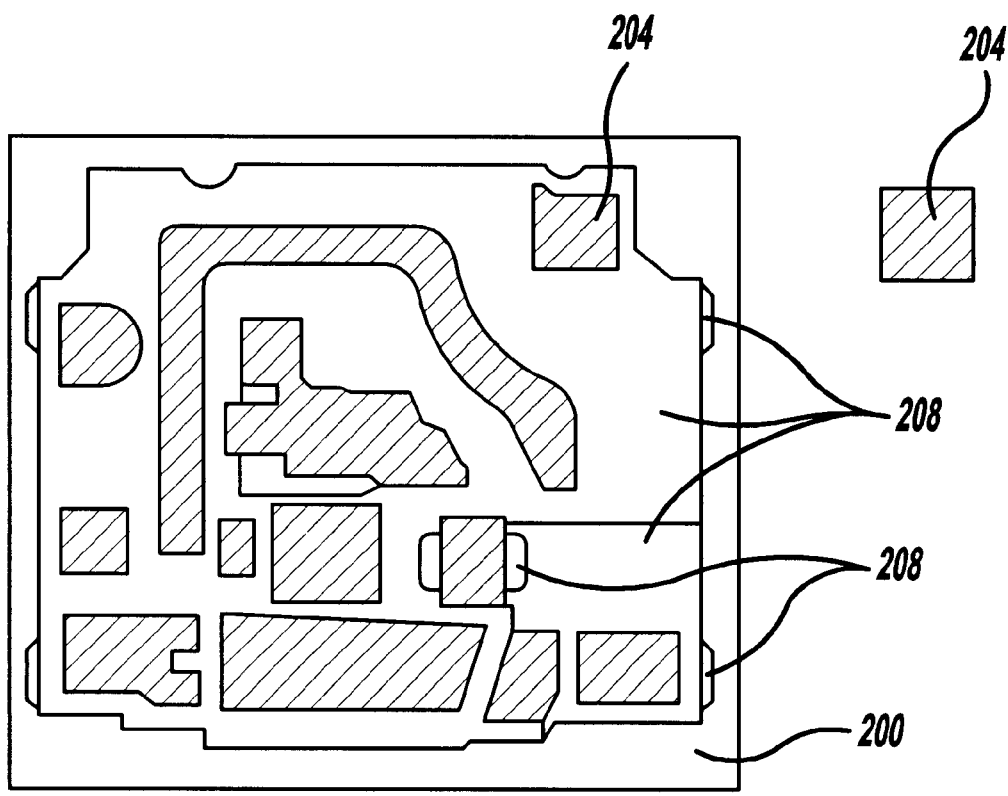
FIG. 5c is a top view of FIG. 5b which depicts identified machining features.

FIG. 5c is a top view of the identified machining features of FIG. 5b. As illustrated in FIG. 5c, the present invention has recognized various machining features of the die part. For example, the present invention has recognized the periphery profile feature 200. The present invention has also recognized the through-pocket profile feature as depicted by cross hatched section 204. Moreover, the present invention has recognized the open pocket feature 208.

Figure 5D:
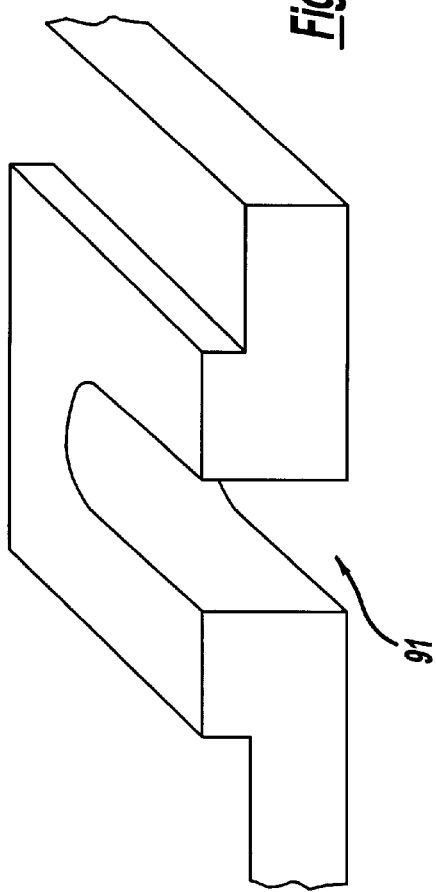
FIGS. 5d, 5e and 5f are diagrammatic perspective views depicting various machining features.
Figure 5F:
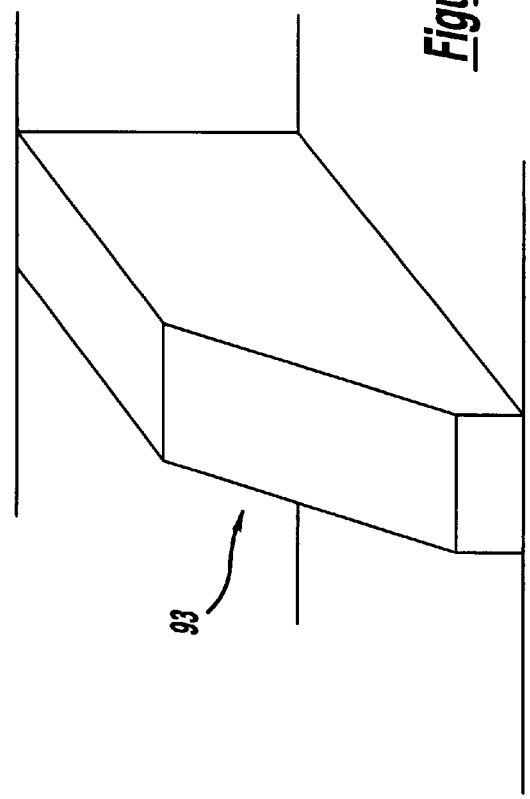
Figure 5E:
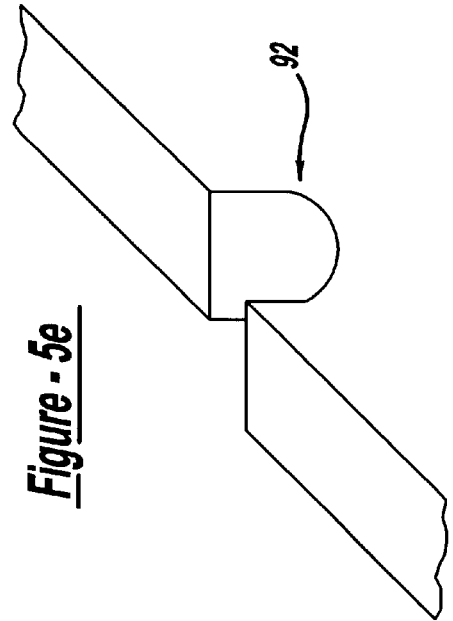

FIGS. 5d–5f depict additional machining features. FIG. 5d depicts an example of a special machining feature known as the bolt slot feature 91. FIG. 5e depicts a special machining feature known as the slot rib feature 92. FIG. 5f depicts a special machining feature known as the step on rib feature 93.

Once the present invention has recognized the machining features from the model data of a die part, then the process plan is generated. The process plan is preferably generated via the steps depicted in the flow chart of FIG. 6.

Figure 6:
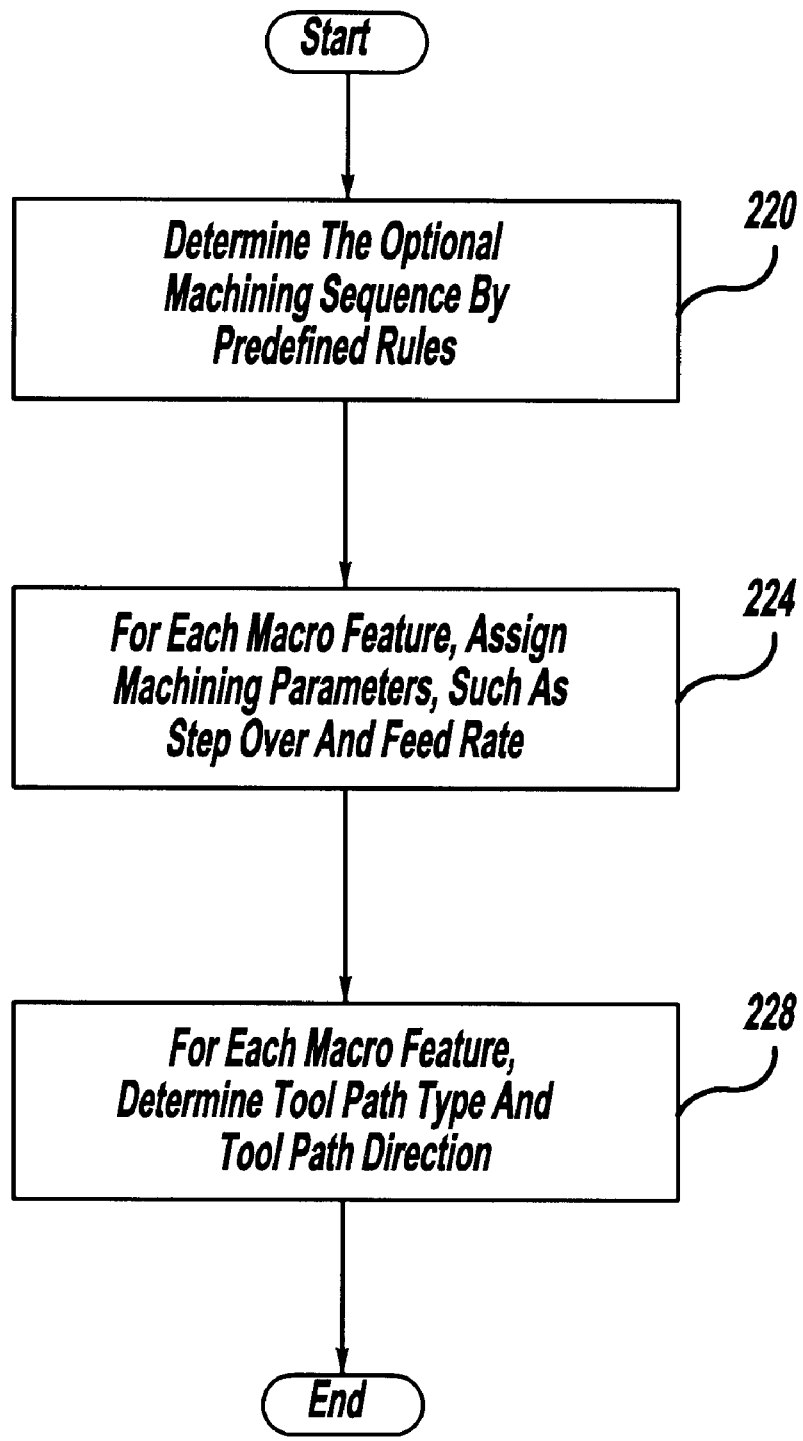
FIG. 6 is a flow chart depicting the steps for generating a process plan.

With reference to FIG. 6, process block 220 determines the optimal machining sequence for each of the recognized machining features by predefined rules. The predefined rules associate machining features with machining priority numbers. The preferred embodiment utilizes the following feature-priority scheme:

| Priority No. | Feature Class | Feature Subclass |
|---|---|---|
| 1 | Special Feature | Slot/Step on Rib Feature |
| 2 | Special Feature | Bolt Slot Feature |
| 2 | Profile Feature | Periphery Profile Feature |
| 2 | Profile Feature | Through-Pocket (Hole) Profile Feature |
| 3 | Pocket Feature (with curved or planar bottom) | Open Pocket Feature |
| 3 | Pocket Feature (with curved or planar bottom) | Closed Pocket Feature |

These predefined rules are used to determine the priority of which features are to be machined first. For example, the through-pocket profile feature has a higher priority number than the open pocket feature 208. Accordingly, the present invention would indicate in its output tool path data files that the through-pocket profile feature is to be cut et feature 208. For machining features which have the same priority present invention selects as the feature which minimizes the travel distance nearest one from the current tool position.

Process block 224 assigns machining parameters for each macro feature. These parameters include, but are not limited to, tool path step over and feed rate parameter. Process block 228 determines the tool path type and tool path direction for each feature. The following table provides the preferred embodiment for associating the machining feature type with a tool path type:

| Feature Subclass | Tool Path Type |
|---|---|
| Periphery Profile Feature | Profile |
| Through-Pocket (Hole) Profile Feature | Profile |
| Open Pocket Feature | Direction Parallel |
| Closed Pocket Featute | Contour Parallel |
| Bolt Slot Feature | Profile |
| Slot/Step on Rib Feature | Direction Parallel |

Figure 7A:
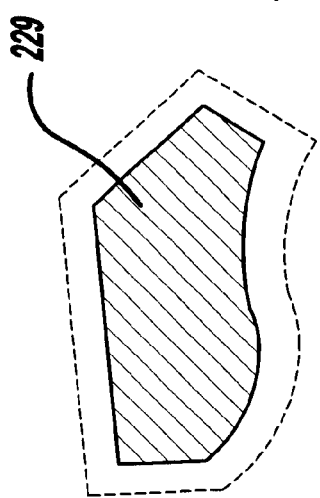
FIGS. 7a, 7b and 7c are respective views of different tool paths on part.
Figure 7C:
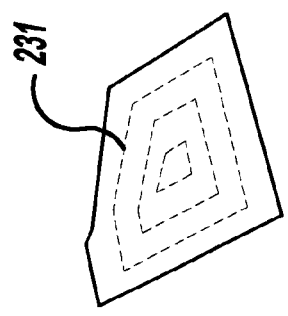
Figure 7B:
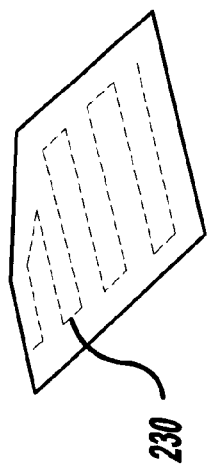

FIGS. 7a–7c illustrate without limitation different tool path types of the preferred embodiment. FIG. 7a illustrates a profile tool path 229. FIG. 7b illustrates a direction parallel tool path type 230. FIG. 7c illustrates a contour parallel tool path type 231.

Figure 8A:
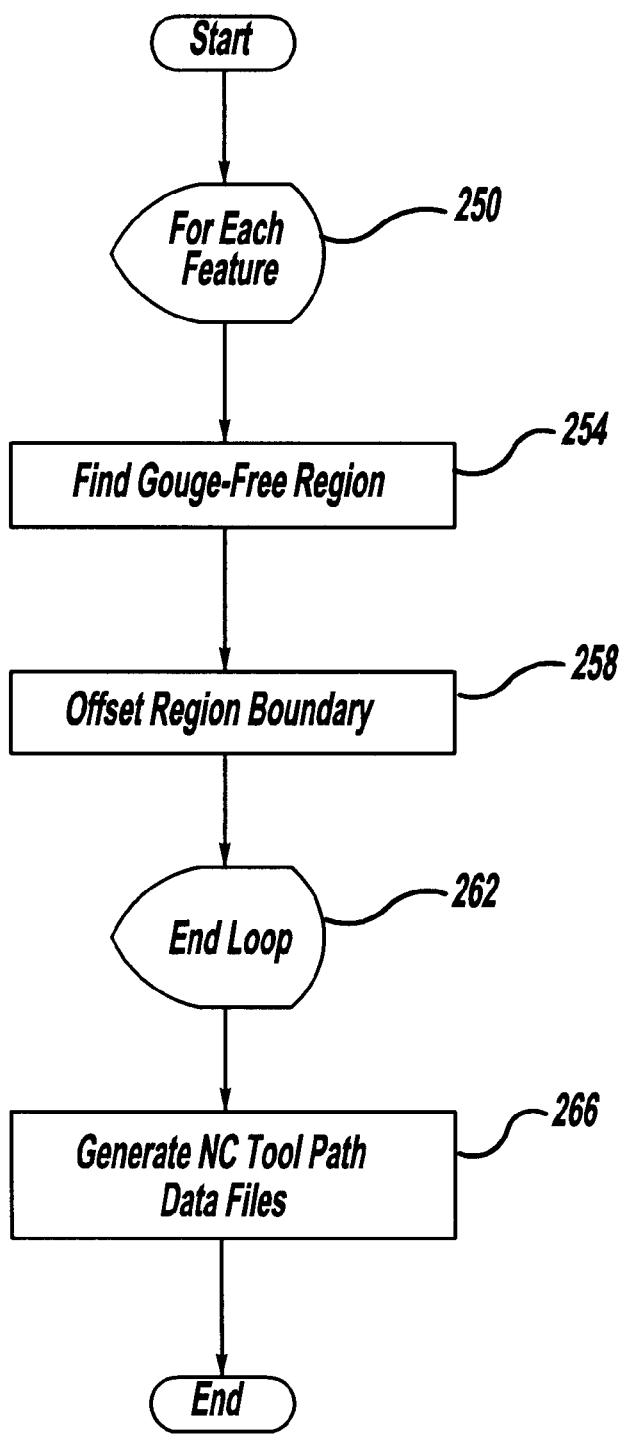
FIG. 8a is a flow chart depicting the steps for generating tool path data files.
Figure 8B:
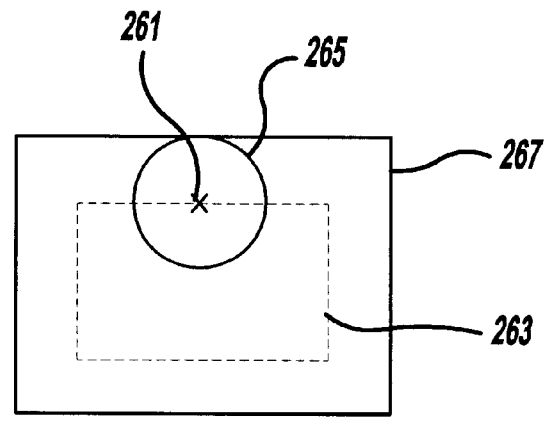
FIG. 8b is a tool path diagram depicting an offset region boundary situation.

FIG. 8a addresses the operations associated with the tool path generator which generates NC tool path data files based upon the process plan. Iteration block 250 and iteration termination block 262 indicate that process blocks 254 and 258 are to be performed for each recognized macro feature. Process block 254 finds the gouge-free region. Within the field of the present invention, the term "gouge-free" refers to not allowing overcutting to be done on a feature. Process block 258 offsets the region boundary in order to confine the tool center location. When the tool center 261 is in the offset region 263, the entire tool 265 resides in the original region 267 (as shown in FIG. 8b).

With reference back to FIG. 8a, process block 266 generates the NC tool path data files in order to provide indication to the NC machine which cutting paths and parameters are to be used. The preferred embodiment uses the CATIA software in order to analyze tool path data against the die part.

Figure 9A:
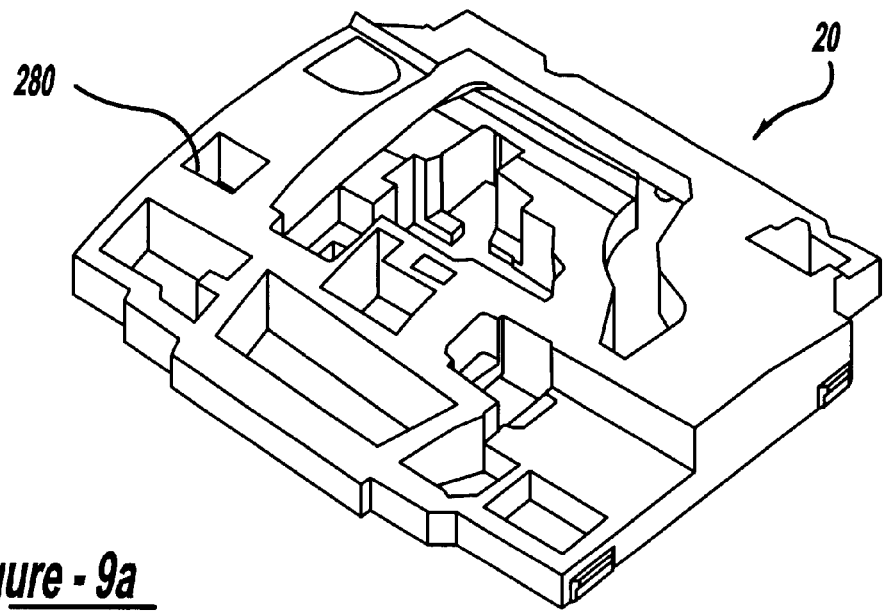
FIGS. 9a, 9b and 9c are diagrammatic prospective views of an exemplary part with tool paths as determined by the present invention being depicted therewith.
Figure 9B:
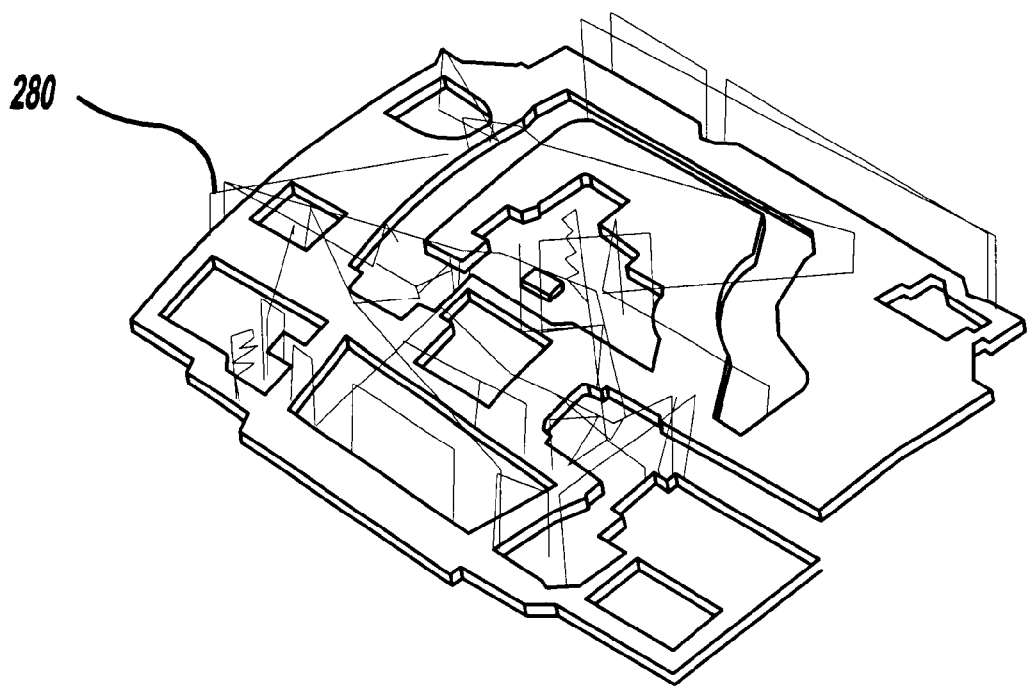
Figure 9C:
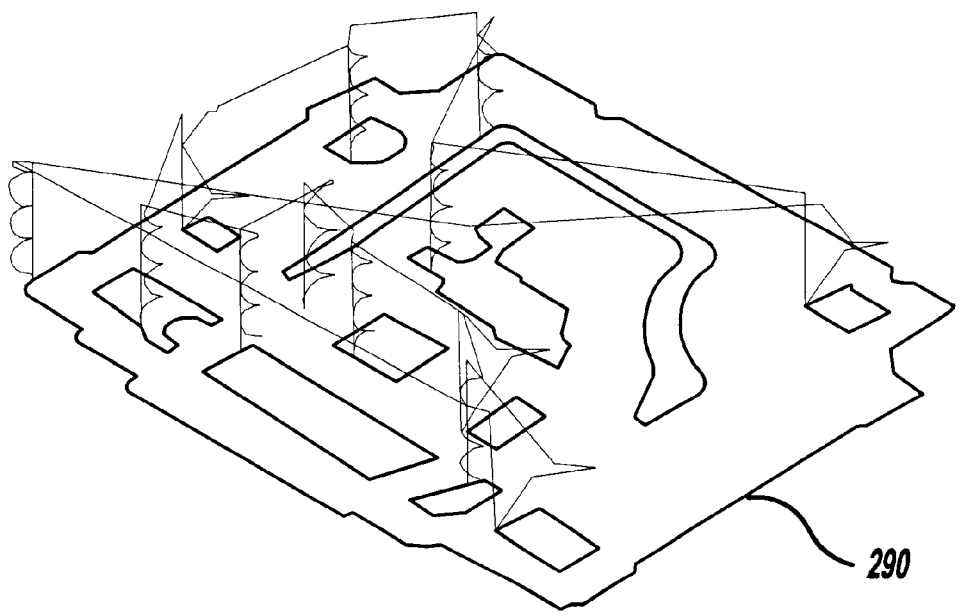

FIGS. 9a–9c depict tool paths as determined by the present invention in order to cut the Styrofoam® stock which is then used to produce die part 20. The white lines on FIG. 9a depict the tool path as represented, for example, by reference numeral 280.

FIG. 9b depicts the NC tool paths as determined by the present invention for the cutting of the pocket feature. Tool path 280 is depicted for establishing a reference point between FIGS. 9a and 9b.

FIG. 9c depicts the NC tool paths as determined by the present invention for the boundary and hole features. An exemplary tool path is depicted by reference numeral 290.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention defined by the appended claims.

We claim:

1. A computer-implemented method for generating tool paths for cutting a physical part, comprising the steps of:
   storing geometric data indicative of the geometric configuration of said part;
   slicing said geometric data by a plurality of planes;
   assigning levels to said sliced geometric data;
   recognizing micro features of said part based upon said sliced geometric data;
   grouping said recognized micro features into macro features based upon a geometric characteristic of said recognized micro features;
   determining a machine feature type for each of said macro features;
   storing machining sequence rules for prioritizing machining operations;
   determining a machining sequence for the part based on the machine feature type associated with each of the macro features and the machining sequence rules, thereby generating tool path control data; and
   using said tool path control data for cutting said physical part.

2. The method of claim 1 wherein said geometric data includes solid model data of said part and includes surface model data of said part.

3. The method of claim 1 further comprising the steps of:
   constructing a z-map model from said stored geometric data; and
   recognizing micro features of said part based upon said constructed z-map model.

4. The method of claim 3 further comprising the steps of:
   slicing a z-map model into grids by a plurality of planes;
   assigning levels to said grids based upon a z value of said z-map model; and recognizing said micro features of said part based upon said assigned levels.

5. The method of claim 4 further comprising the steps of:
   grouping adjacent grids which have equivalent assigned levels; and
   determining said macro features of said part based upon said grouped adjacent grids.

6. The method of claim 1 wherein said machining feature types are selected from the group consisting of profile features, pocket features, special features and combinations thereof.

7. The method of claim 1 further comprising the steps of:
   determining machining parameters based upon determined macro features.

8. The method of claim 7 wherein said machining parameters are selected from the group consisting of step over distance, feed rate and combinations thereof.

9. The method of claim 1 further comprising the steps of:
storing feature-tool path mapping rules for mapping macro features with predetermined tool paths; and
determining said tool path control data based upon said stored feature-tool path mapping rules and said classified macro features.

10. The method of claim 1 wherein said part is a die used in a vehicle construction process.

11. A computer-implemented apparatus for generating tool paths for cutting a physical part, said physical part having a geometric configuration which is associated with geometric data to indicate said geometric configuration, comprising:
a z-map model builder for slicing said geometric data by a plurality of planes and for assigning levels to said sliced geometric data;
a micro feature classifier for recognizing micro features of said part based upon said sliced geometric data;
a macro feature classifier for grouping said recognized micro features into macro features based upon a geometric characteristics of said recognized micro features, and determining a machine feature type for each of said recognized micro features; and
a process plan generator for generating tool path control data based in part upon the machine feature type for each of said macro features of said part; wherein said tool path control data is used for cutting said physical part.

12. The apparatus of claim 11 wherein said geometric data includes solid model data of said part and includes surface model data of said part.

13. The apparatus of claim 11 further comprising:
a merger module for constructing a z-map model from stored geometric data, said micro features of said part being recognized based upon said constructed z-map model.

14. The apparatus of claim 13 wherein said z-map model builder slices said z-map model into grids by a plurality of planes, said grids being assigned levels bases upon the z value of said z-map model, said micro features of said part being recognized based upon said assigned levels.

15. The apparatus of claim 14 wherein said micro feature classifier groups adjacent grids which have equivalent assigned levels.

16. The apparatus of claim 11 wherein said machining feature types are selected from the group consisting of profile features, pocket features, special features and combinations thereof.

17. The apparatus of claim 11 further comprising:
machining sequence rules for prioritizing machining operations;
wherein said tool path control data is determined based upon said machining sequence rules and said macro features, where each of the macro features includes a machining feature type, said part being a die used in a vehicle construction process.

18. A computer-implemented method for generating tool paths for cutting a physical part, comprising the steps of:
storing geometric data indicative of the geometric configuration of said part;
storing machining sequence rules for prioritizing machining operations;
slicing said geometric data by a plurality of planes;
recognizing micro features of said part based upon said sliced geometric data;
grouping said recognized micro features into macro features based upon a geometric characteristic of said recognized micro features;
determining a machine feature type for each of said macro features;
determining a machining sequence for cutting the part based on the machine feature type for each of the macro features and the machining sequence rules, thereby generating tool path control data; and
using said tool path control data for cutting said physical part.

* * * * *